UNITED STATES PATENT OFFICE.

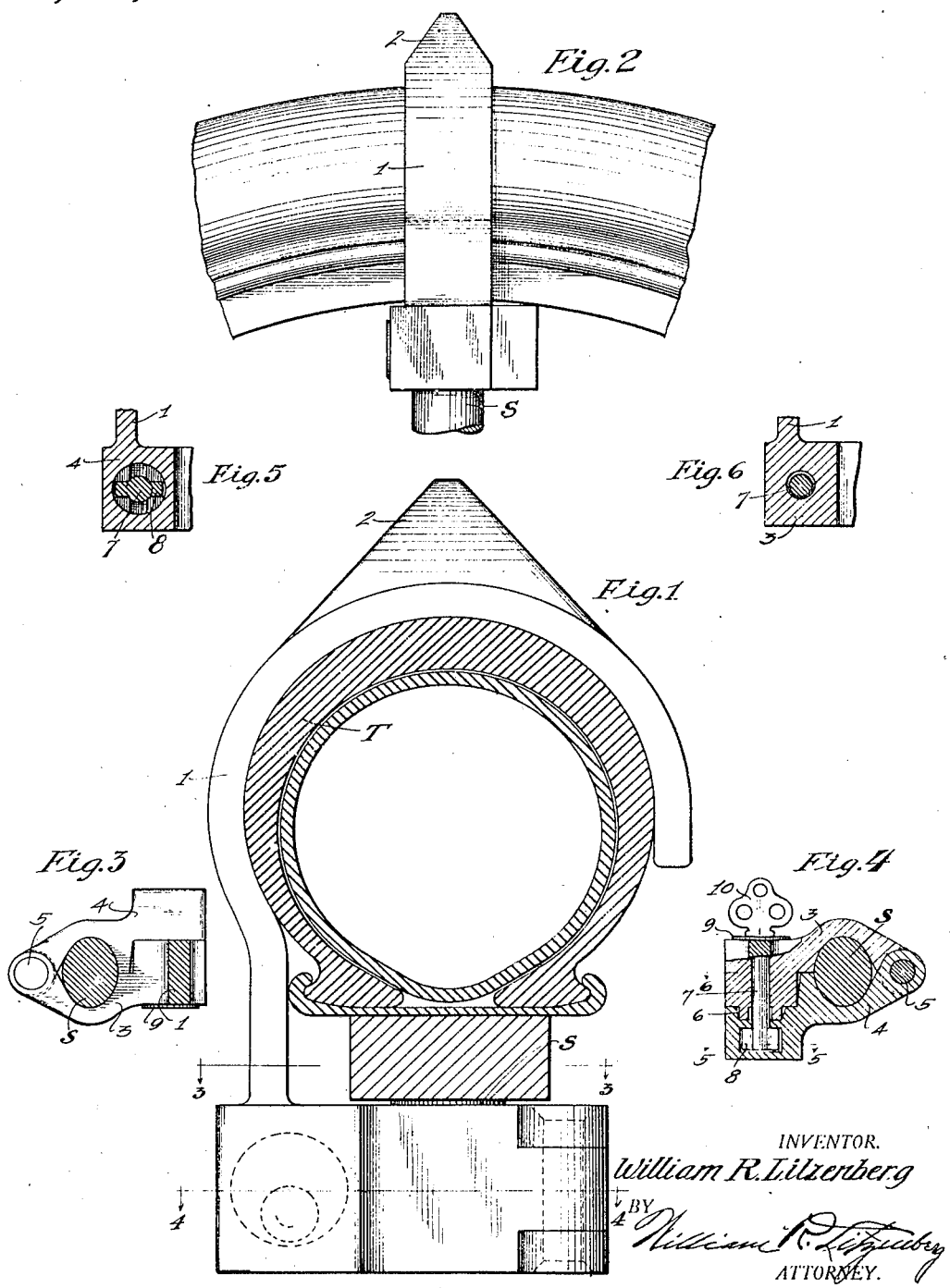

WILLIAM R. LITZENBERG, OF LOS ANGELES, CALIFORNIA.

AUTO-WHEEL CHOCK.

1,292,822.  Specification of Letters Patent.  Patented Jan. 28, 1919.

Application filed March 9, 1918. Serial No. 221,409.

*To all whom it may concern:*

Be it known that I, WILLIAM R. LITZENBERG, a citizen of the United States, residing in the city of Los Angeles, Los Angeles county, California, have invented certain new and useful Improvements in Auto-Wheel Chocks, of which the following is a specification.

My invention relates to auto wheel chocks such as are applied to a wheel for the purpose of retarding its rolling action, and for the further purpose of indicating that the automobile to the wheel of which it is applied is, in all probability, being stolen, or is being driven by a person who has no authority with it.

The principal object of my invention is to provide a wheel chock of the character referred to which can be hooked over the tire of a wheel and locked to one of the spokes of the wheel in such manner that it cannot be removed without the proper key or combination for unlocking the same.

I have illustrated one practical embodiment of my invention on the accompanying sheet of drawings, in which,—

Figure 1 is a sectional view through a wheel rim and tire, showing my improved wheel chock applied thereto in locked position;

Fig. 2 is a fragmentary side elevation of a wheel rim, showing my invention applied thereto;

Fig. 3 is a cross sectional view, on a reduced scale, taken on line 3—3 of Fig. 1;

Fig. 4 is a similar view taken on line 4—4 of Fig. 1;

Fig. 5 is a sectional view on line 5—5 of Fig. 4; and

Fig. 6 is a sectional view on line 6—6 of Fig. 4.

Referring now in detail to the drawings, my invention as here illustrated, comprises a body 1, of hook-like form, adapted to be hooked over a tire T, and provided with a chock point 2, adapted to gouge into the surface over which a wheel is passing if it is attempted to turn the wheel with the chock applied thereto. At the opposite end, said body, 1, is provided with a locking device adapted to be locked to one of the spokes, S, of the wheel to which the chock is applied. This device comprises a fixed spoke-engaging portion, 3, preferably cast as a part of the body, 1, and a hinged spoke-engaging portion, 4, hinged to the portion, 3, as at 5, and at its other end having an interfitting engagement with the body, as at 6. A bolt 7, provided with an interlocking T, 8, is rotatably mounted in one portion of the spoke-engaging device and is controlled by means of a lock, 9, with key, 10. It will be understood, of course, that any suitable locking means can be used for locking the spoke-engaging part of the device. It will also be understood that other changes in details can be made without departing from the spirit of the invention, and I do not, therefore, limit the invention to the details here shown, except as I may be limited by the hereto appended claim.

I claim:

A wheel chock of the character referred to comprising a body of hook-like form adapted to hook over a wheel tire and having a projecting chock portion adapted to engage the surface and retard said wheel, said body being provided at its opposite end with a spoke-engaging portion formed as a rigid part thereof, and also with a second spoke-engaging portion hingedly connected at one end and at its opposite end adapted to be locked about a spoke, and locking means for locking the same.

Signed at Los Angeles, Los Angeles county, California, this 1st day of March, 1918.

WILLIAM R. LITZENBERG.

Witnesses:
 D. P. KENDRICK,
 LUTHER S. MACK.